July 19, 1966  J. D. SCIOLORO  3,261,423
APPARATUS FOR FORESTALLING FLOW OF CURRENT TO THE ELECTRICAL
SYSTEMS OF A MOTOR VEHICLE IN CASE OF A HEAD ON COLLISION
Filed Aug. 26, 1964

INVENTOR.
Joseph D. Scioloro
BY
Paul E. Mullendore
ATTORNEY.

United States Patent Office 3,261,423
Patented July 19, 1966

3,261,423
APPARATUS FOR FORESTALLING FLOW OF CURRENT TO THE ELECTRICAL SYSTEMS OF A MOTOR VEHICLE IN CASE OF A HEAD-ON COLLISION
Joseph Dudley Scioloro, 14620 Rath St., La Puente, Calif.
Filed Aug. 26, 1964, Ser. No. 392,155
6 Claims. (Cl. 180—83)

This invention relates to an apparatus to forestall flow of current from a battery in the electrical system of a motor vehicle in case of a collision.

Usually head-on collisions are most disastrous because they result in the wreckage bursting into flames and burning thereof before the occupants can be removed. Such fires are usually caused by the storage battery remaining intact, so that it is capable of continuing supply of electrical current to the disrupted electrical system and the discharge of sparks that cause combustion of leaking fuel or fuel vapors.

With the above in mind, the principal object of the present invention is to provide an apparatus that operates automatically immediately upon impact to break off a terminal of the storage battery, so that the current is permanently cut off at its source.

It is also an object of the invention to provide an apparatus that may be built into the structure of a motor vehicle, or which may be provided as an attachment to an existing motor vehicle.

In accomplishing these and other objects of the invention, I have provided improved structure, the preferred forms of which are illustrated in the accompanying drawings, wherein.

Figure 1:
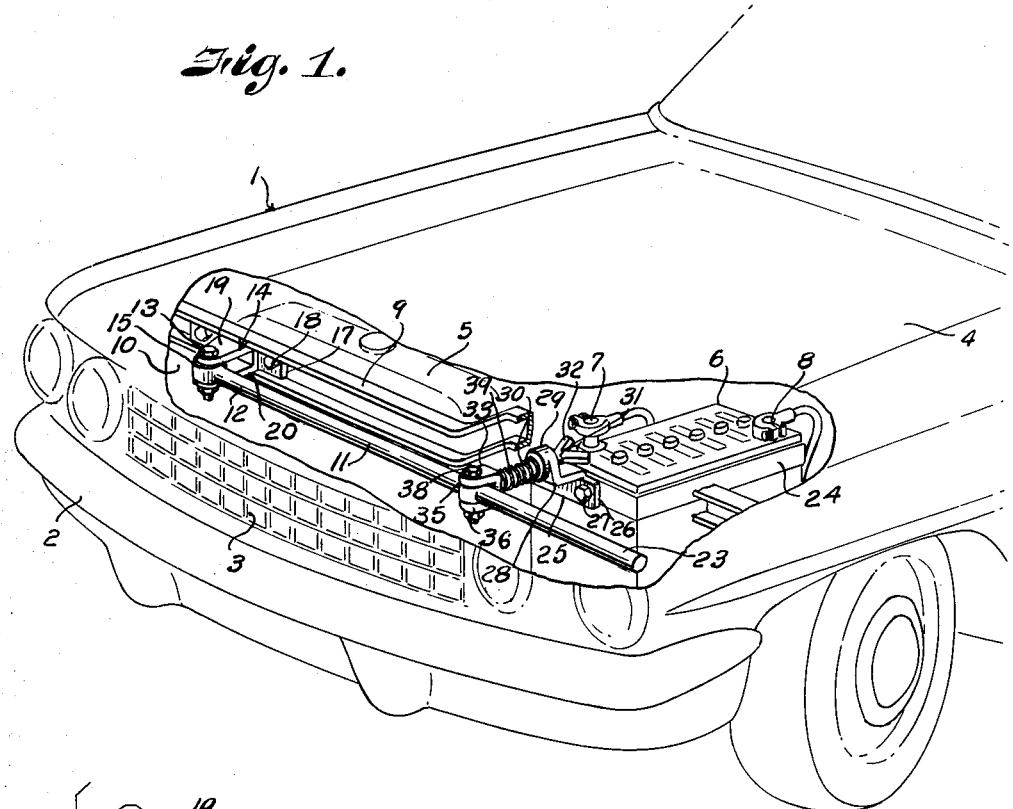
FIG. 1 is a perspective view of the front portion of a motor vehicle equipped with one form of the invention, parts of the vehicle being broken away for better illustration of the invention.
Figure 2:
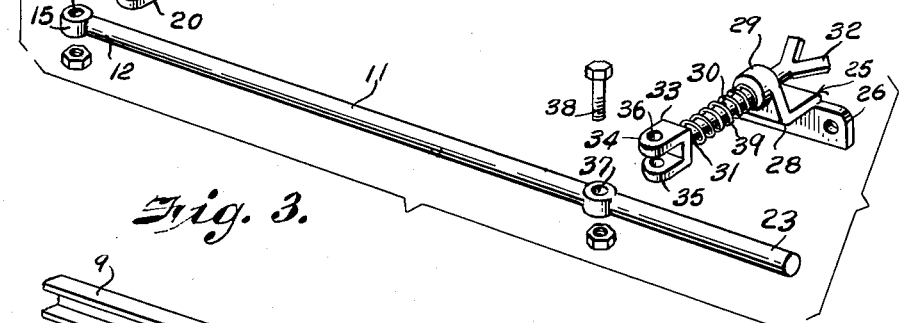
FIG. 2 is a perspective view of the parts of the apparatus, shown in disassembled, spaced relation, and prior to attachment to the motor vehicle.

Referring more in detail to the drawings:

1 designates a forepart of a motor vehicle and which is subject to first contact in case of a head-on collision. Usually such motor vehicles include a front bumper 2, a grille 3, and a hood 4, forming part of the enclosure of the power assembly, which includes an internal combustion engine necessitating a radiator 5 for removing heat of combustion by flow of air through the grille 3. Such vehicles are provided with an electrical storage battery 6 having terminals 7 and 8 connected with the electrical system that operates the engine and other electrical equipment of the vehicle. Usually such batteries are carried in the line of air flow through the grille, so that the battery does not accumulate the heat being generated in the motor compartment. The radiator 5 and battery 6 are usually protected by a transverse frame member 9 connected at its ends with the frame of the motor vehicle.

While the frameworks of modern motor vehicles are constructed to withstand destructive forces, it is impossible to make them sufficiently strong to withstand head-on collisions. Consequently, the result is that the framework gives way and the force of the impact is carried through to the engine, causing disruption of the fuel and electrical systems. Therefore, highly volatile vapors from the leaking fuel are ignited by sparks from the electrical system, and the wreckage burns with such violence it is often impossible to remove the injured occupants.

In a head-on collision, there is an interval between the time that the grille 3 gives way and the impact reaches the radiator 5, due to the space 10 therebetween. I have discovered that this interval is sufficient to dispose of the hazard produced from the electrical system, thereby eliminating the danger of igniting the leaking fuel. I have also discovered that this is best accomplished by providing means actuated by the force of the impact during the time interval to sever or break off one of the terminals, for example 7, of the battery 6.

In carrying out the invention, one form thereof is the provision of a transverse bar 11 located in the space 10 between the grille 3 and the frame member 9. The bar 11 extends substantially horizontally along the width of the space 10, so that a part thereof is assured to be in the point of impact. The end 12 of the bar 11 that is remote from the battery 6 is pivotally connected by a pivot 13 with a bracket 14. In the illustrated instance, the end 12 of the bar 11 has an integral cylindrical portion 15 having a bore 16 through which the pivot 13, such as a bolt, extends.

The bracket 14 in the illustrated instance includes a plate portion 17 that is fixed rigidly to the frame member 9 by fastening devices such as bolts 18. Extending forwardly from the plate portion 17 are spaced apart arms 19 and 20 having openings 21 and 22 to carry ends of the pivot 13. The opposite end 23 of the bar is adapted to swing in a horizontal plane from the pivot 13 under force of an impact toward the battery 6. Fixed to the holddown frame 24 of the battery is a bracket 25 including a plate portion 26 that is fixed to the holddown frame by fastening devices 27, and carried by the plate portion 26 is a forwardly extending arm 28 carrying an integral bearing part 29 which has a through bore in alignment with the battery terminal 7. Loosely slidable within the bore is a stem 30 of a ram 31 terminating in front of the battery terminal in a fork 32. The opposite end of the stem 30 carries a yoke-shaped head 33 having spaced apart ears 34 and 35 receiving the bar 11 therebetween. The ears have opening 36 registering with an opening 37 in the bar 11 to pass a fastening device such as a bolt 38 which pivotally connects the bar 11 with the stem 30. Sleeved on the stem 30 and having one end bearing against the head 33 and the opposite end against the bearing part 29 is a coil spring 39, to normally hold the ram in retracted position, so as to normally prevent shorting of the terminal 7 of the battery by the fork thereof.

With this mechanism, a head-on collision will act upon the bar 11 and drive the fork 32 of the ram into contact with the battery terminal 7 with sufficient force to shear off or break the terminal from the battery, and thereby eliminate flow of current to the electrical system.

Figure 3:
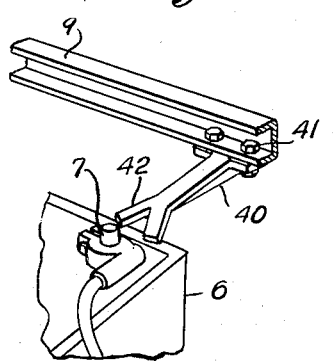
FIG. 3 is a fragmentary perspective view of a modified form of the invention.

In the form of the invention illustrated in FIG. 3, a ram 40 is fixed directly to the frame member 9 by fastening devices such as bolts 41. The ram extends forwardly and terminates short of the battery terminal 7 in a fork 42. In this form of the invention, the bending of the frame member 9 under the force of the impact will cause the fork 42 to shear off or break the battery terminal 7.

What I claim and desire to secure by Letters Patent is:

1. In a motor vehicle having a battery provided with terminals connected with electrical equipment of the vehicle, an apparatus for forestalling flow of electric current from the battery in case of a head-on collision of the motor vehicle, said apparatus including
   means carried by the motor vehicle and responsive to collision for breaking off one of the terminals of the battery.

2. In a motor vehicle having a battery provided with terminals connected with electrical equipment of the vehicle, an apparatus for forestalling flow of electric current from the battery in case of a head-on collision of the vehicle, said apparatus including actuating means carried by the motor vehicle in the path of the collision, and means connected with the actuating means for breaking off one of the terminals of the battery.

3. In a motor vehicle having a battery provided with terminals connected with electrical equipment of the vehicle, an apparatus for suspending flow of electric current from the battery in case of a head-on collision of the vehicle, said apparatus including actuating means carried by and extending transversely of the vehicle in the path of the collision, and means connected with the actuating means for breaking off one of the terminals of the battery.

4. In a motor vehicle having a battery located in a forepart of the vehicle along one side of the engine of the vehicle and provided with terminals connected with electrical equipment of the vehicle and said vehicle having a transverse frame member forwardly of the engine, a bar substantially coextensive with the frame member, means pivotally mounting one end of the bar on the transverse frame member with the other end being free and extending in front of the battery, a ram connected with the bar near the free end thereof, and means guidedly supporting the ram in alignment with a terminal of the battery for breaking off said terminal upon movement of the bar under force of a head-on collision.

5. In a motor vehicle having a battery located in a forepart of the vehicle along one side of the engine of the vehicle and provided with terminals connected with electrical equipment of the vehicle and said vehicle having a transverse frame member forwardly of the engine, a bar substantially coextensive with the frame member, means pivotally mounting one end of the bar on the transverse frame member with the other end being free and extending in front of the battery, a ram connected with the bar near the free end thereof, means guidedly supporting the ram in alignment with a terminal of the battery for breaking off said terminal upon pivotal movement of the bar under force of a head-on collision, and means for yieldingly holding the ram from contact with the terminal.

6. In a motor vehicle having a battery located in a forepart of the vehicle along one side of the engine of the vehicle and provided with terminals connected with electrical equipment of the vehicle and said vehicle having a space between the radiator and grille of the vehicle, a bar in said space to the rear of the grille and substantially coextensive with the frame member, means mounting one end of the bar with the other end being free and extending in front of the battery, a ram connected with the bar near the free end thereof, and means guidedly supporting the ram in alignment with a terminal of the battery for breaking off said terminal upon movement of the bar under force of a head-on collision.

References Cited by the Examiner

UNITED STATES PATENTS

| | | | |
|---|---|---|---|
| 1,682,731 | 9/1928 | Austin | 180—83 |
| 1,996,528 | 4/1935 | Smith | 180—83 |
| 1,999,216 | 4/1935 | Smith | 180—83 |
| 2,012,539 | 8/1935 | Maas | 180—83 |
| 2,845,144 | 7/1958 | Bohn | 180—83 X |

KENNETH H. BETTS, *Primary Examiner.*